(No Model.)
W. W. DELANO, Jr.
CHURN.
No. 336,217. Patented Feb. 16, 1886.
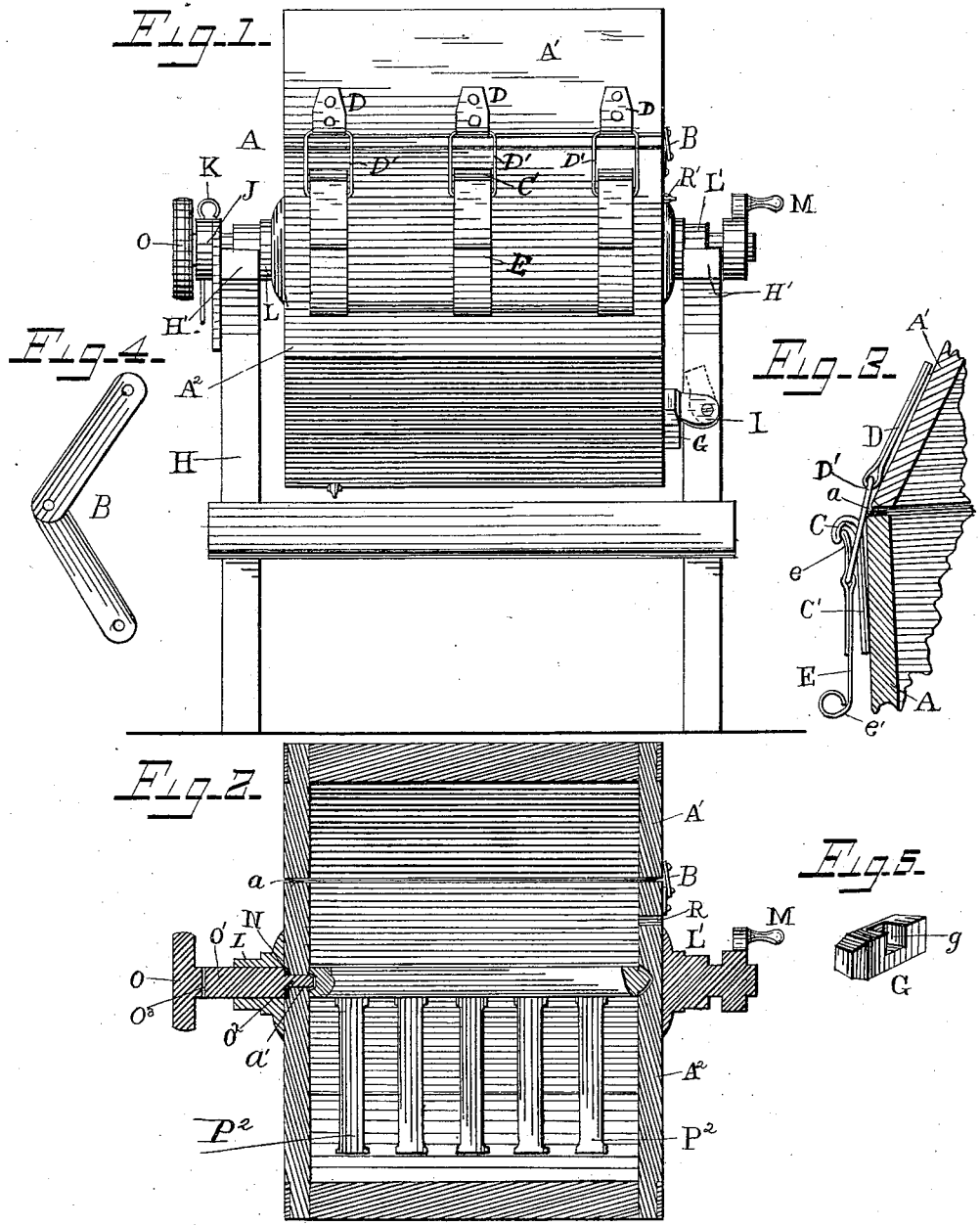
Witnesses
R. W. Bishop.
P. B. Turpin.
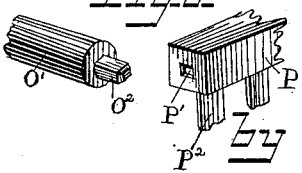
Inventor
Wm. W. Delano Jr.
By R. S. & A. P. Lacey
Attys.

UNITED STATES PATENT OFFICE.

WILLIAM W. DELANO, JR., OF WATERBURY, VERMONT.

CHURN.

SPECIFICATION forming part of Letters Patent No. 336,217, dated February 16, 1886.

Application filed January 8, 1885. Serial No. 152,296. (No model.)

*To all whom it may concern:*

Be it known that I, WILLIAM W. DELANO, Jr., a citizen of the United States, residing at Waterbury, in the county of Washington and State of Vermont, have invented certain new and useful Improvements in Churns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of churns known as "working-body" churns; and it consists in certain details of construction and combination and arrangement of parts, as will be hereinafter described and claimed.

In the drawings, Figure 1 is a front view of my machine. Fig. 2 is a vertical longitudinal section of the body, showing the removable journal, &c., in position. Fig. 3 is a detached section showing the cover-fastening. Fig. 4 is a detail side view of the cover-support. Figs. 5 and 6 are detail views, all of which will be described and claimed.

The body A is preferably made six-sided or hexagonal in cross-section, but can be made with more or less sides, and has cover A', hinged at one edge to the main portion or box A². I preferably provide a support, B, similar to the ordinary trunk-lid support, as will be seen in Fig. 4. This support is composed of the metal plates hinged together at one end, and having their opposite ends pivoted, one to the cover A' and the other to the box A², so as to support the cover when raised, as will be obvious to the mechanic.

On the outer side of the box A², at the upper edge thereof, is fixed the hook or hooks C, having their shanks C' secured to the box in any suitable manner. The hook C is bent outward and downward, as will be understood from Fig. 3.

On the swinging edge of the cover A' is fastened the lever-supports D, in line with and corresponding in number with the hook or hooks C on the box. I preferably make these supports D in the form of loops, as shown, though such arrangement might be modified without departing from the broad principles of my invention.

The lever or levers E are pivoted near their points *e* to the outer ends of the links D.

The points *e* of the levers E are in operation engaged under the hooks C, and their handles *e'* are depressed, bringing said parts to the position shown in Fig. 3, when the box and cover are firmly united, as will be seen.

It is usual to interpose a packing-strip, *a*, between the box and the cover, so that when the fastenings C D E are actuated into the position shown in Figs. 1 and 3 the cover is firmly clamped onto the packing, and all leaking is thereby prevented.

On one side of the body A, I fix a block, G, having a notch or slot, *g*.

The framing H is provided with a hinged button or latch, I, adapted to be turned into the notch *g*, so as to hold the body from revolving in one or the other direction when desired—as, for instance, when the cream is being placed in or the butter removed from the box.

The frame A is provided with pillow-blocks or bearing H', adapted to support the trunnions of the body.

A ring or keeper, J, is secured to the framing and projected above one of the beams H', and on the outer side of the same. This ring is provided with a transverse opening, through which is projected the pin K, for the purpose presently described.

The body A is provided with trunnions L L', supported in bearings H', and one of said trunnions, usually L', is provided with a hand-crank, M, or other suitable expedient, whereby rotary motion may be communicated to the body. The trunnion L is made hollow, and an opening, *a'*, is formed through the box in line with the bore of the trunnion L. I prefer to make opening *a'* of a smaller size than the bore of the trunnion, in order to provide a shoulder at the inner end of such bore against which to place the packing N, though manifestly the packing may be arranged in other ways; or the parts could be closely fitted and the packing dispensed with. The dasher-support O is passed through ring or keeper J and through the trunnion L, and is provided with a stem, O'. This stem O'a lar point, O², which, projecting through opening a' and beyond the inner side of the body, extends into an angular recess or socket, P', formed on one end of the dasher-bar P. The opposite end of this bar is journaled in or to the opposite side of the body. The support O may, when desired, be provided with a handle-disk on its outer end for convenience in its manipulation. The dasher-arms P² extend radially from the main bar. The support is held from revolving by pin K, passed through ring J and extending into or through an opening, O³, formed in the said support, and the said support holds the dasher from revolving by means of its angular extremity O², which is fitted in a corresponding socket in the dasher-bar, as before described. This ring J, support O, &c., serve another purpose than that above described—namely, they hold the trunnion L in its bearing. By the construction described the dasher is firmly held from revolving, and may be easily removed by simply withdrawing pin K and removing the support O.

In the head of my churn, near the center, I have a small vent, R, which is used for the purpose of letting the steam escape when hot water is used in scalding and washing the churn, and may be stopped by a plug, R'.

In operation the body will be rapidly revolved and the milk and cream will be dashed forcibly against the breaker-arms of the dasher, and will be quickly and thoroughly churned. The butter can be evenly worked by revolving the body, which presses the butter through between the arms of the dasher. I do not desire to be limited, in the broad features of my invention, to the specific means of retaining support O, shown in the drawings, and before described, as it is manifest that for such means as ring J and pin K there may be substituted various other expedients, such as clamping-screws turned through the support O into the framing or other devices, as will be obvious to a mechanic. It will also be understood that the arrangement of the sockets in the dasher-bar and in the angular stem of the rod O might be reversed when desired, though I prefer to employ the construction as shown and before described, because of its simplicity and ease of operation.

Having described my invention, what I claim, and desire to secure by Letters Patent, is—

In a working-body churn having its sides arranged at angles to each other and divided longitudinally through two of these angles, whereby a section of the churn-body is separated and formed into a lid, the combination of said lid hinged at one side to the main portion of the body, the hook C on one part of the body, the staple or strap D, arranged on the other part of the body, a link, a, extended across and bearing upon the angular edge or corner made by the meeting edges, and the lever E, pivoted to the free end of the link, and provided with the extension or part e, arranged to engage under the hook C, substantially as set forth.

In testimony whereof I affix my signature in presence of two witnesses.

WILLIAM W. DELANO, JR.

Witnesses:
WALTER S. SHAW,
MAY A. SHAW.